UNITED STATES PATENT OFFICE.

WALTER NORMAN HAWORTH AND JAMES COLQUHOUN IRVINE, OF ST. ANDREWS, SCOTLAND.

PREPARATION OF DIMETHYL SULFATE.

1,401,693. Specification of Letters Patent. Patented Dec. 27, 1921.

No Drawing. Application filed November 19, 1918. Serial No. 263,239.

*To all whom it may concern:*

Be it known that we, WALTER NORMAN HAWORTH and JAMES COLQUHOUN IRVINE, subjects of the King of Great Britain, residing at St. Andrews, Fifeshire, Scotland, have invented certain new and useful Improvements in and Relating to the Preparation of Dimethyl Sulfate, of which the following is a specification.

This invention has for its object the manufacture of dimethyl sulfate.

The process consists in the union of dimethyl ether with sulfur trioxid by direct means, and under selected conditions.

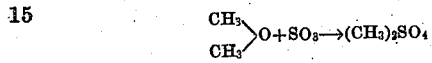

We have discovered that combination of the two reagents takes place with great readiness in the presence of a solvent or diluent, and, for this purpose, the product itself is preferably employed—viz. dimethyl sulfate. We have found however that if this product be distilled directly it gives a very poor yield of the pure substance. This is traceable to the presence of a small amount of $SO_3$. We got over this difficulty at first by pouring the crude product on to powdered ice, as warm $H_2SO_4$ destroys dimethyl sulfate, but at ice temperature this is not the case. The use of ice is expensive and inconvenient so we reduce the remaining $SO_3$ with a reducing agent such as iron filings which we stir in at the end of the reaction using a slight excess beyond that required by theory. Filtration or decantation then gives us a crude dimethyl sulfate which serves for all purposes almost as well as the pure product, and moreover it distils easily and without decomposition under diminished pressure to give the pure colorless dimethyl sulfate.

We further find that we can dilute our stream of $SO_3$ with advantage, and lead this mixture into the solvent (dimethyl sulfate previously provided) and in this form there is no trouble with $SO_3$ crystallizing in the leading tubes. The source of our $SO_3$ has in this series of experiments been 20% oleum which we have heated to distil over the $SO_3$, and this is better conveyed along the leading tubes by bubbling a slow current of dry air through the upper surface of the oleum. The residual sulfuric acid can be used to absorb more $SO_3$ to convert it into oleum.

Sulfur dioxid has little or no effect on dimethyl sulfate.

We may therefore in practice pass the mixture of air, $SO_2$ and $SO_3$ (which results from the contact process of making $SO_3$), directly into dimethyl sulfate, and lead in by a separate inlet pipe dimethyl ether ($Me_2O$) in approximately the proportions required by the equation below

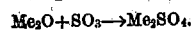

$$Me_2O + SO_3 \rightarrow Me_2SO_4.$$

The air and $SO_2$ thus pass on through the liquid, and, after suitable baffling to remove any vapor of $Me_2SO_4$ carried over, this mixture of $SO_2$ and air can be conveyed back to the catalyzing chamber and more $SO_3$ made or the $SO_2$ may be absorbed in a solvent or led to waste. Thus there is no necessity to distil oleum as the source of $SO_3$, and the process is all the less dangerous to carry out, as oleum distillation may give trouble unless carefully controlled.

*Example.*

Fifty grams of preformed dimethyl sulfate were placed in a vessel in which were arranged two leading tubes dipping below the surface of the liquid. Through one of these tubes a stream of dimethyl ether gas was admitted, and through the other a current of sulfur trioxid vapor; the latter vapor may be mixed with air as an aid to its transmission, or it may be contaminated with sulfur dioxid and air in the form in which it is generated by known catalytic processes. During the passing of the gases the liquid medium is agitated or stirred, and the rate of admission is regulated in such a manner that no escape of dimethyl ether or of sulfur trioxid occurs from the outlet at the top of the vessel. As a precautionary measure, the outlet pipe from the upper part of the vessel may be led into another such vessel also containing preformed dimethyl sulfate, so that complete absorption will be assured. The control of the gases and vapor is so arranged that approximately equimolecular quantities of dimethyl ether and sulfur trioxid pass into the liquid medium of dimethyl sulfate simultaneously, and the containing vessel is kept cool by an outer jacket or internal coil through which cold water circulates. Immediate combination of the two reagents occurs with the formation of constantly increasing quantities of dimethyl sulfate, so that the initial quantity of 50 grams serving as solvent or medium gains greatly in bulk. By introducing another tube into the vessel, quantities of the crude product can be drawn off from time to time, or an arrangement can be provided for the continuous overflow of the dimethyl sulfate as more of it is formed. By following this procedure the process can be run continuously over a prolonged and indefinite period. As no loss of the reagents occurs, this being aided by having suitable water cooled condensing plant, the reaction is almost quantitative. There are practically no secondary reactions which interfere with the process under these conditions, but it is essential that the dimethyl ether and all other gases should be perfectly dry and free from alcohol before admission. In this way, and working in small laboratory apparatus experimentally, more than 200 grams of crude dimethyl sulfate can easily be made in the course of a day. Larger scale working is merely a matter of expansion of the size of vessel and feeds, with appropriate increase of the initial amount of dimethyl sulfate used as solvent medium.

An alternative scheme of working which was found to give good results, although not so convenient, was to pass the sulfur trioxid into the solvent medium until a considerable amount had accumulated in the solution, and then pass in the dimethyl ether gas as a separate operation, or vice versa, but in these cases the process requires more careful control to avoid loss of reagents.

After reducing the crude product with the aid of iron filings or other suitable reducing agent it is then only necessary to rectify it under diminished pressure to obtain pure dimethyl sulfate.

We declare that what we claim is:—

1. A process of preparing dimethyl sulfate which consists in directly combining dimethyl ether and sulfur trioxid in the presence of a solvent initially comprising dimethyl sulfate.

2. A process of preparing dimethyl sulfate which consists in directly combining dimethyl ether and sulfur trioxid in presence of previously provided dimethyl sulfate itself and another diluent.

3. The continuous process for the preparation of dimethyl sulfate which consists in simultaneously passing gaseous dimethyl ether and gaseous sulfur trioxid into dimethyl sulfate initially present as a diluent.

4. A process of preparing dimethyl sulfate which consists in directly combining dimethyl ether with sulfur trioxid in dilute gaseous form and performing the reaction in presence of dimethyl sulfate itself as a diluent.

5. A process of preparing dimethyl sulfate which consists in directly combining dimethyl ether with sulfur trioxid, removing traces of residual sulfur trioxid by reduction and distilling the mixture.

6. A process of preparing dimethyl sulfate which consists in directly combining dimethyl ether and sulfur trioxid, removing the residual sulfur trioxid by metallic iron and distilling the mixture.

7. A process of making dimethyl sulfate which comprises simultaneously passing into a solvent dimethyl ether and a mixture of air, sulfur dioxid, and sulfur trioxid, resulting from the contact process of making sulfur trioxid.

In witness whereof, we have hereunto signed our names this 25th day of October, 1918, in the presence of two subscribing witnesses.

WALTER NORMAN HAWORTH.
JAMES COLQUHOUN IRVINE.

Witnesses:
ALLAN BAXTER,
SUSAN H. P. LOW.